(12) United States Patent
Skinner et al.

(10) Patent No.: US 6,378,271 B1
(45) Date of Patent: Apr. 30, 2002

(54) APPARATUS AND METHODS FOR SECURING ARTICLES TO CONTAINERS

(75) Inventors: Edward Albert Skinner, Welwyn Garden City (GB); Robert E. Rochelle, South Lyon; John A. Weber, Weberville, both of MI (US)

(73) Assignee: Elopak Systems AG, Glattbrugg (CH)

( * ) Notice: Subject to any disclaimer, the term of this patent is extended or adjusted under 35 U.S.C. 154(b) by 494 days.

(21) Appl. No.: 09/059,207

(22) Filed: Apr. 13, 1998

Related U.S. Application Data

(63) Continuation-in-part of application No. 08/803,391, filed on Feb. 20, 1997, now abandoned.

(51) Int. Cl.[7] ............................................. B65B 61/00
(52) U.S. Cl. ..................... 53/410; 53/133.1; 53/133.2; 156/69
(58) Field of Search ................................ 53/410, 133.1, 53/133.2, 133.4; 493/87, 102, 114, 213; 156/69, 309.9, 321, 322

(56) References Cited

U.S. PATENT DOCUMENTS

| | | | |
|---|---|---|---|
| 3,498,868 A | 3/1970 | Saumsiegle | |
| 3,813,315 A | 5/1974 | Valyi | |
| 4,507,168 A | 3/1985 | Konaka | |
| 4,669,640 A | 6/1987 | Ando et al. | |
| 4,788,811 A | 12/1988 | Kawajiri et al. | |
| 4,813,578 A | 3/1989 | Gordon et al. | |
| 4,872,935 A | 10/1989 | Newkirk et al. | |
| 4,925,034 A | 5/1990 | Ribichaud et al. | |
| 4,934,127 A | 6/1990 | Risko et al. | |
| 4,948,015 A | 8/1990 | Kawajiri et al. | |
| 4,964,562 A | 10/1990 | Gordon | |
| 4,990,200 A | 2/1991 | Heinz | |
| 5,088,643 A | 2/1992 | Frazier et al. | |
| 5,101,999 A | 4/1992 | Robichaud et al. | |
| 5,152,438 A | 10/1992 | Gordon et al. | |
| 5,249,695 A | 10/1993 | Luch et al. | |
| 5,296,075 A | 3/1994 | Hardigg et al. | |
| 5,473,857 A | 12/1995 | Keeler | |
| 5,484,374 A | * 1/1996 | Bachner et al. | ............. 53/133.2 |
| 5,624,528 A | 4/1997 | Abrams et al. | |
| 5,716,471 A | 2/1998 | Pape | |
| 5,819,504 A | * 10/1998 | Giacomelli et al. | ......... 53/133.4 |
| 5,867,966 A | * 2/1999 | Mogard | ..................... 53/133.2 |

FOREIGN PATENT DOCUMENTS

| | | |
|---|---|---|
| JP | 3-114738 | 5/1991 |
| WO | WO 88/05012 | 7/1988 |
| WO | WO 92/14604 | 9/1992 |
| WO | WO 96/39332 | 12/1996 |
| WO | WO 97/04953 | 2/1997 |

\* cited by examiner

*Primary Examiner*—Eugene Kim
(74) *Attorney, Agent, or Firm*—Reising, Ethington, Barnes, Kisselle, Learman & McCulloch, P.C.

(57) ABSTRACT

An apparatus and method for securing a pour spout fitment to a panel of a filled and sealed thermoplastic-coated carton, wherein a machine 10 is mounted over a conveyor 12 conveying a line of cartons. Within the machine 10, a selected panel surface of each filled and sealed carton is heated to a predetermined temperature; next, at least an annular surface of a flange of the fitment is heated to a predetermined temperature. When the heated surface of the fitment is applied to the heated surface of the carton, the heat energy is transferred to the latter surface to an extent capable of activating the thermoplastic coating thereon. Upon pressing and cooling, the fitment and the carton surface are bonded together, without the need for a back-up or support mechanism, such as a mandrel or anvil. Alternatively, the fitment may be secured to the carton by way of a jetted-on, circular bead of hot melt adhesive.

17 Claims, 11 Drawing Sheets

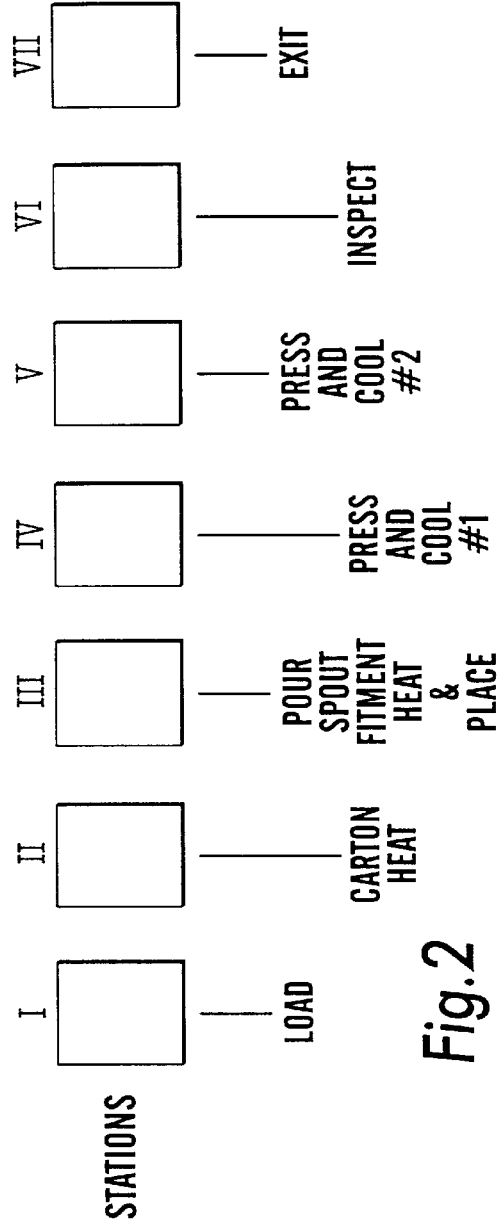
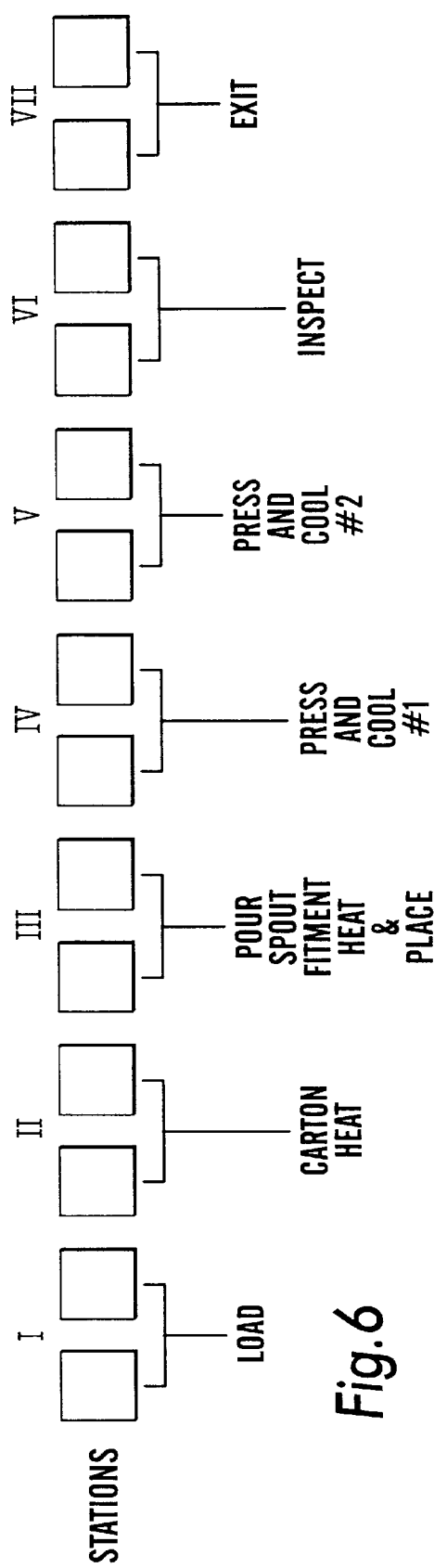

APPARATUS AND METHODS FOR SECURING ARTICLES TO CONTAINERS

This application is a continuation of international application PCT/GB 98/0038, filed Feb. 20, 1998, which designated the United States and is now abandoned. This application is a continuation-in-part of U.S. Ser. No. 08/803,391 now abandoned, filed Feb. 20, 1997.

This invention relates primarily to an apparatus and method for securing an article to a container and, more particularly, to such an apparatus and method wherein a support mechanism, such as a mandrel or anvil, is not required.

Heretofore, articles, such as pour spout fitments, have been secured to thermoplastic-coated container panels by the following methods, In U.S. Pat. No. 4,813,578, the following method is employed: A mandrel is inserted into the interior of the still-open mouth of the container, with the mandrel abutting the interior surface of a barrier layer and forming a back-up support. Hot air or radiant heat is applied to the external surface of a gable top wall immediately around an opening to thereby soften the polyethylene coating, with a pour spout fitment flange placed on the softened layer to thereby adhere the flange to the wall. An external mandrel is also employed to press the assembly against the internally positioned mandrel. This pressure is maintained until the coating cools and thereby effects permanent adhesion of the flange to the wall. Other methods, such as ultrasonic adhesion and impulse heating, may be employed.

U.S. Pat. No. 5,249,695 merely recites that attachment to the polymer-coated paperboard panel is accomplished by welding or otherwise adhering a spout fitment flange to the polymer coating.

U.S. Pat. Nos. 4,964,562 and 5,152,438 each utilize an ultrasonic sealing horn and a back-up support mandrel operative around respective pouring apertures.

U.S. Pat. No. 4,948,015 discloses the use of an ultrasonic horn to bond a flange of a pour spout fitment to an inner or back surface of a container panel around a pouring aperture.

U.S. Pat. No. 4,669,640 suggests fusing a pour spout flange to an inside surface of a carton gable top either thermally or ultrasonically.

U.S. Pat. No. 5,088,643 states that the pour spout fitment is preferably adhered to the outer surface of the container panel by impulse heating under pressure such as ultrasonic sealing although other methods may be used as desired.

U.S. Pat. No. 4,925,034 discloses adhesively bonding a pour spout fitment by a hot melt glue to a top outer surface of a container.

U.S. Pat. No. 5,101,999 suggests that a spout or closure be "attached to the package top by any suitable means such as an adhesive applied to a bottom surface of the closure to be attached to the package top". Where the package is coated with an outer thermoplastic layer of polyethylene, which discourages such adhesion, perimeter cuts may be made which may be serrated or applied as perforated cuts. Such serrations or perforated cuts need only penetrate the polyethylene outer layer to allow the adhesive to bond with the underlying carrier or paper layer.

WO-A-88/05012 discloses a container having an upper rim portion onto which a laminated cover is bonded. The adjacent surface of the cover is heated to above its melting point, in order to bond to the rim portion.

WO-A-96/39332 of the present assignee discloses a pouring spout attachment applied to a pourable-product-carrying container over a location where the container has one of a partial depth cut and an opening formed therein. The attachment includes a body and may have a removable cap mounted thereon. The body includes an internal projection, an external mounting flange, and an internal end wall having a web segment cut therein so as to be movable as a flap about a pivot axis.

WO-A-92/14604 discloses a method and apparatus for attaching a spout to an open-top, bottom-sealed carton. A conveyor moves the carton successively to three stations. At the first station, a hole punch punches a hole. At the second station, a glue applicator applies adhesive to the bonding site. At the third station, a spout attaching assembly applies a spout to the prepared site. The carton is subsequently filled and top-sealed. The glue applicator includes a horizontal gun which is rotated in a circle in a vertical plane to form a complete circle of bonding agent on the vertical external surface of the carton around the hole, ready to receive an annular flange of the fitment.

U.S. Pat. No. 5,473,857 discloses a fitment application apparatus, for applying plastic spout fitments to filled and sealed cartons, integrated in line with a conventional form/fill/seal production line. The apparatus advances formed, filled and sealed cartons to a fitment application station. For this purpose, the cartons are carried from the end of the form/fill/seal production line by a continuous line conveyor terminating at a dead plate between a pair of continuous line conveyors; an escapement allows the pair of conveyors to advance cartons one-by-one to an indexing flight conveyor extending through the fitment application station and advancing the cartons to a continuous delivery conveyor. A hopper and associated gravity-feed track supply a series of fitments to a fitment applicator anvil at the application station. Each fitment has a flange the bottom surface of which is coated with hot melt adhesive as the fitment slides past a hot melt adhesive applicator roll. A fitment retaining mechanism receives and positions each fitment such that the flange bottom surface coated with hot melt adhesive faces an external side of the wall of the filled carton. The fitment applicator anvil intermittently carries fitments from the fitment retaining mechanism into abutting relationship with the filled carton in registration with the spout hole, thereby pressing the flange bottom surface coated with hot melt adhesive against the extrusion layer on the external side of the carton wall, whereby the fitment is bonded to the filled and sealed carton. WO-A-97/04953 discloses a similar system, except for integration in line with a form-fill-seal machine.

WO-A-97/16302 discloses a method for securing a pour spout fitment to a thermoplastic-coated container, wherein filled and sealed gable-top cartons are diverted onto an indexing turret where each of a plurality of nodding receivers rotating with the turret receives a pour spout fitment, presents the fitment to a source of heat to render tacky the bottom surface of a flange of the fitment, and places the fitment onto an already heated portion of a roof panel of a carton around an opening or loop of weakness therein, thereby to bond together the fitment and the panel. The receivers are continously cooled to promote the bonding. In practice, a section of a flat top conveyor extending from a form-fill-seal machine to a casing machine would be altered to adapt it to the fitment-attaching machine.

According to one aspect of the present invention, there is provided a method comprising manufacturing a first package by forming a first container, filling the container with contents, sealing the filled container and then advancing the first container by conveying means, characterized by subsequently installing attaching means at said conveying means without altering said conveying means and manufacturing a second package by forming a second container, filling the second container with contents, sealing the filled second container, advancing the second container by said conveying means, and operating said attaching means to attach an article to an external surface of the filled and sealed second container.

According to a second aspect of the present invention, there is provided apparatus for manufacturing a package, comprising forming means for forming a container, filling means after said forming means for filling said container with contents, sealing means after said filling means for sealing the filled container, article attaching means after said sealing means for attaching said article to an external surface of the filled and sealed container, and conveying means extending past, in turn, said forming means, said filling means, said sealing means and said attaching means for advancing said container past, in turn, said forming means, said filling means, said sealing means and said attaching means, characterized in that said attaching means was installed at said conveying means without said conveying means having been altered.

Owing to these aspects of the invention, it is possible to provide an article-attaching station downstream of a sealing station of a form-fill-seal machine without altering the existing conveyor (s). Thus, provision of the station does not involve extra work and cost in adapting the existing conveyor (s) nor does subsequent removal of the station involve extra work and cost in restoring the existing conveyor (s) if and when attaching of articles is no longer required.

According to a third aspect of the present invention, there is provided a method of manufacturing a package, comprising forming a container, filling the container with contents, top-sealing the filled container, and attaching an annular portion of a pour spout fitment by way of adhesive to an upwardly facing, external surface of the filled and sealed container, characterized in that said attaching comprises applying said adhesive to said external surface of the filled and sealed container to provide a bead in the form of a closed loop of adhesive, and applying said annular portion to said bead, which is of a form corresponding to that of said annular portion.

According to a fourth aspect of the present invention, there is provided apparatus for use in manufacturing a package, comprising conveying means, forming means adjacent said conveying means for forming a container on said conveying means, filling means adjacent said conveying means for filling the formed container, top-sealing means adjacent said conveying means for sealing the top of the filled container, and fitment-attaching means adjacent said conveying means for attaching a pour spout fitment to an upwardly facing external surface of the filled and sealed container, characterized in that said fitment-attaching means comprises adhesive-applying means for applying a jet of adhesive to said external surface of the filled and sealed container, jet-displacing means arranged to displace said jet relative to said external surface to provide on said external surface an adhesive bead in the form of a closed loop of said adhesive, and applying means for applying a portion of a fitment to said bead to attach said fitment to said container.

Owing to applying the annular bead of adhesive after top-sealing, the bead can be applied to such upwardly facing external surface, so that there is a lower tendency for the adhesive to run down the surface (or even flow through a pouring hole, if provided, into the interior of the container) and thus reduce the efficacy of attachment of the fitment to the container and/or thus smear conveying and other surfaces and so disrupt the operation of the system.

According to a fifth aspect of the present invention, there is provided a method for securing articles to container panels, said method comprising the steps of:
 a. heating to a predetermined temperature a surface of a selected panel of an erected container;
 b. receiving an article from a supply source by a receiver;
 c. displacing aid receiver so as to expose a selected surface of said article to a heat source to heat said surface to a predetermined temperature;
 d. displacing said receiver further so as to place the heated surface of said article onto said surface of said erected container; and
 e. pressing a cooled anvil against another selected surface of said article to bond said heated surface thereof to said heated surface of said erected container.

Owing to this aspect of the invention, simple and effective cooling of the heated bonding material is achieved.

According to a sixth aspect of the present invention, there is provided apparatus for receiving an article and placing same on a selected panel of an erected container, said apparatus comprising a pivotally mounted, fluidic, piston-and-cylinder device having a reciprocable receiver provided thereon, a first stationarily mounted, fluidic, piston-and-cylinder device having a reciprocable abutment provided thereon for pushing said article from a track into said receiver, a second stationarily mounted, fluidic, piston-and-cylinder device having a reciprocable heated tool provided thereon for heating a surface of said article upon the pivoting of said article into alignment therewith by the pivotally mounted piston-and-cylinder device, the pivotally mounted piston-and-cylinder, after further pivoting thereof, serving to place said heated surface of said article on said selected panel.

Owing to this aspect of the invention, simple and effective application of the article to the container is achieved.

Preferred embodiments of the invention each provide an improved apparatus and method for securing an article to a thermoplastic coating of a laminate, in particular securing a pour spout fitment to a thermoplastic-coated container panel. Both of the pour spout fitment and the panel may be heated, by suitable heating mechanisms, to a predetermined temperature, such that, when the fitment is applied to the panel of the container, heat from the fitment is transferred to the panel to raise the temperature of a fitment-receiving portion of the panel surface to a level capable of activating the thermoplastic coating; upon cooling, the fitment and the container surface bond together.

The preferred apparatus and method are applied downstream of all forming, filling and sealing operations performed on the container, and are capable of being installed and performed over an existing conveyor system downstream of a conventional forming, filling and sealing machine, without any alteration of that existing system being necessary.

Preferably, the apparatus is a machine mounted over a conveyor carrying filled and sealed containers, such machine including stations at which each successive container, or pair of containers, enters the machine; (a) selected top closure panel(s) is/are heated; the flange(s) of (a) pour spout fitment(s) is/are heated and placed on the selected panel(s); the flange(s) is/are pressed while cooling to become bonded; the package(s) manufactured is/are inspected; and the package(s) exit(s) the machine.

The apparatus and method are adaptable, when required, to multiple in-line indexing, wherein a feeder bowl would include multiple discharge tracks, or a multiple of feeder bowls could be used.

In order that the invention may be clearly understood and readily carried into effect, reference will now be made, by way of example, to the accompanying drawings, in which:

FIG. 2 is a diagrammatic layout of stations within the machine of FIG. 1;

FIG. 6 is a view similar to FIG. 2, but representing double stations within the machine of FIG. 1;

Figure 1:
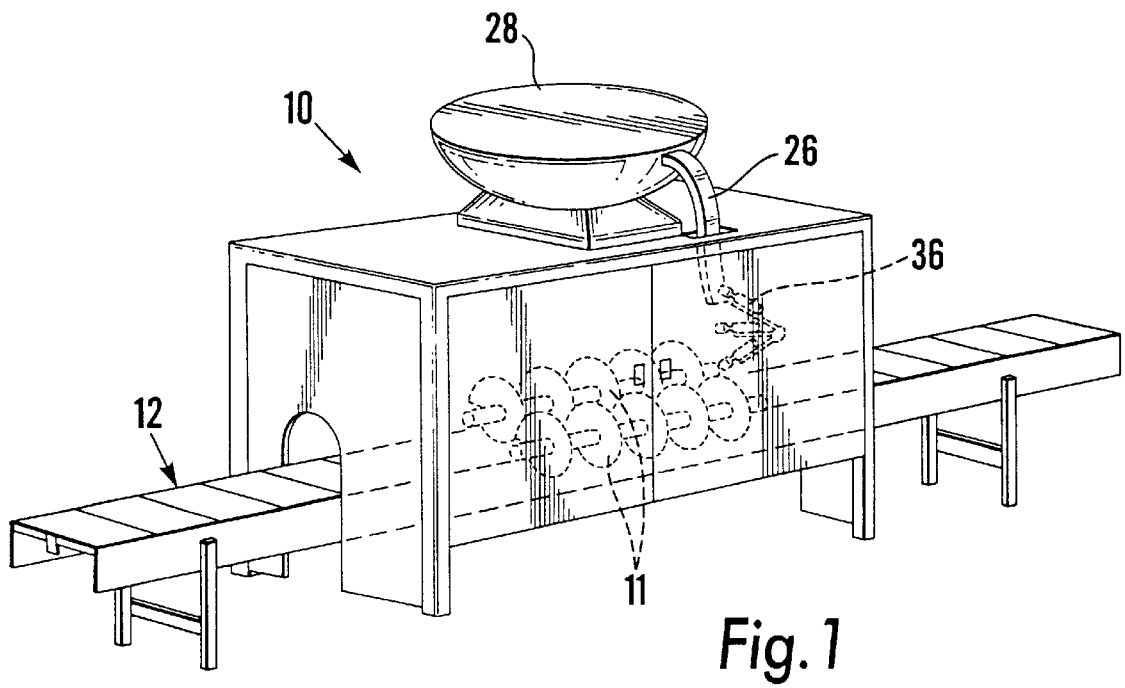
FIG. 1 is a diagrammatic perspective view of a fitment-attaching machine mounted over an existing conveyor.

Referring now to FIGS. 1 to 7 in greater detail, FIG. 1 shows a machine 10 mounted over a flat-top conveyor 12 carrying formed, filled and sealed thermoplastic-coated cartons 14 (FIG. 3), which are coming from a typical and well-known forming, filling and sealing machine (not shown).

Figure 3:
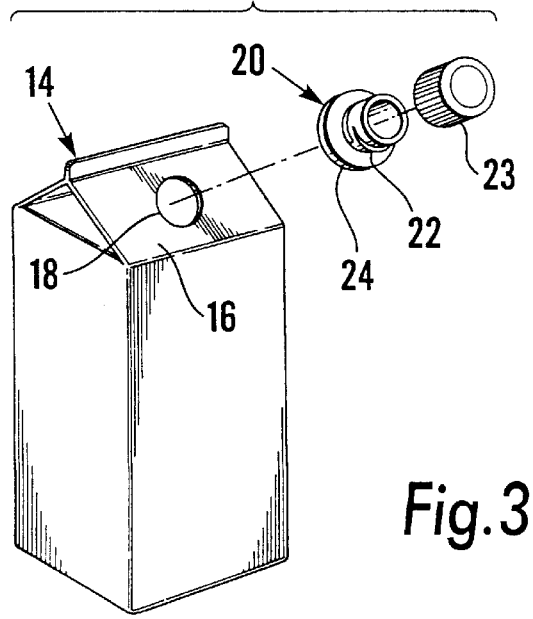
FIG. 3 is a perspective view of a gable top carton, and a perspective view of a pour spout fitment to be attached to the carton.
Figure 4D:
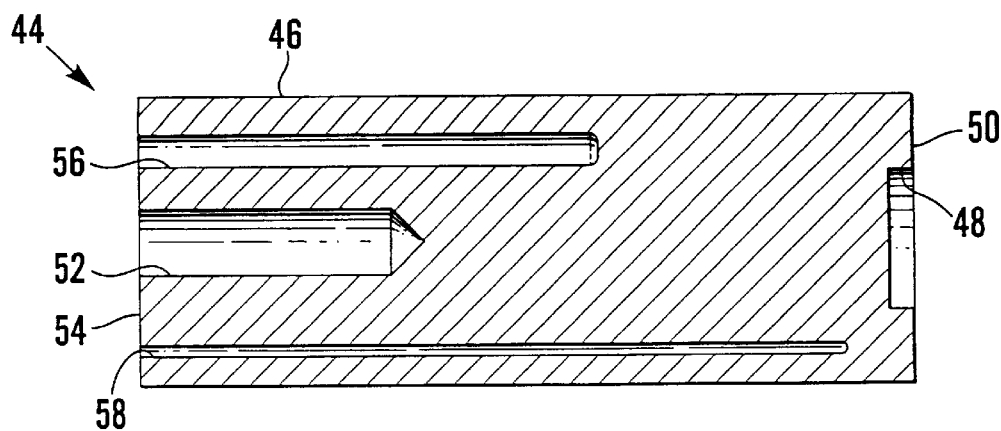
FIG. 4D is an enlarged detail of FIG. 4B.
Figure 3A:
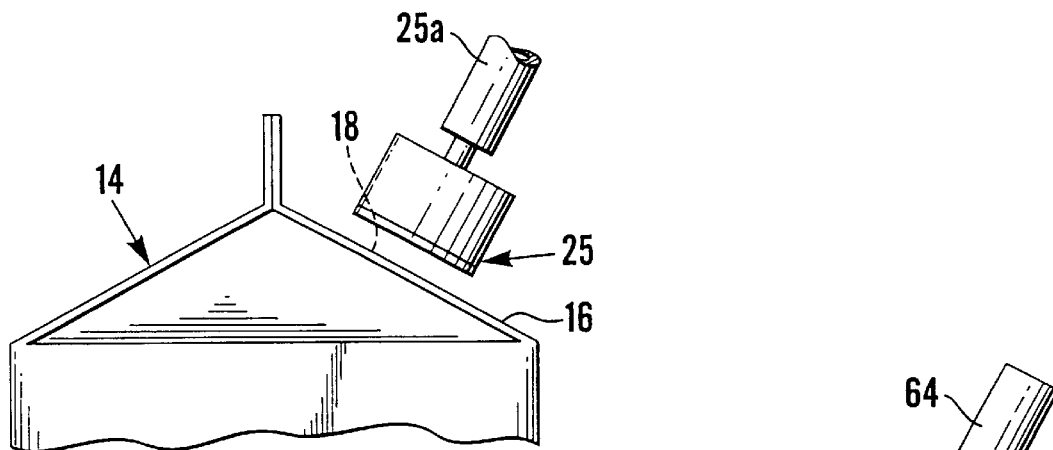
FIG. 3A is a side elevational view of a heating arrangement for heating a selected panel of the carton.
Figure 5:
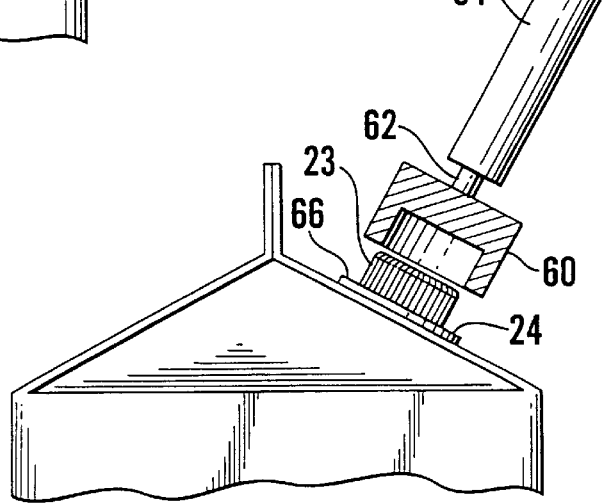
FIG. 5 is a partly sectional side view of a press and cool arrangement.
Figure 4A:
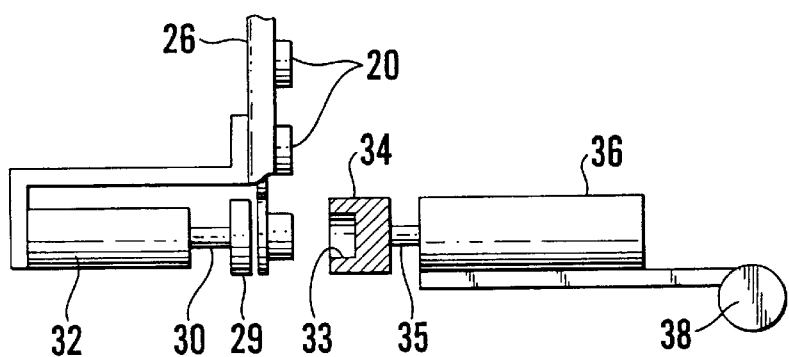
FIG. 4A is a partly sectional, side view of a fitment loading apparatus operating at a fitment-heating and-placing station.
Figure 4B:
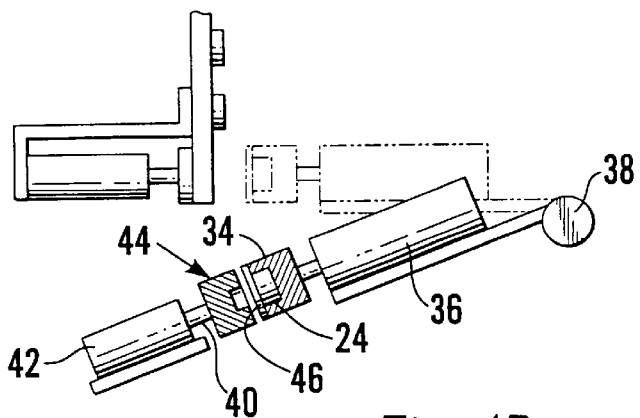
FIG. 4B is a partly sectional, side view of the fitment-loading apparatus and of a fitment-heating apparatus operating at the fitment-heating and-placing station.
Figure 4C:
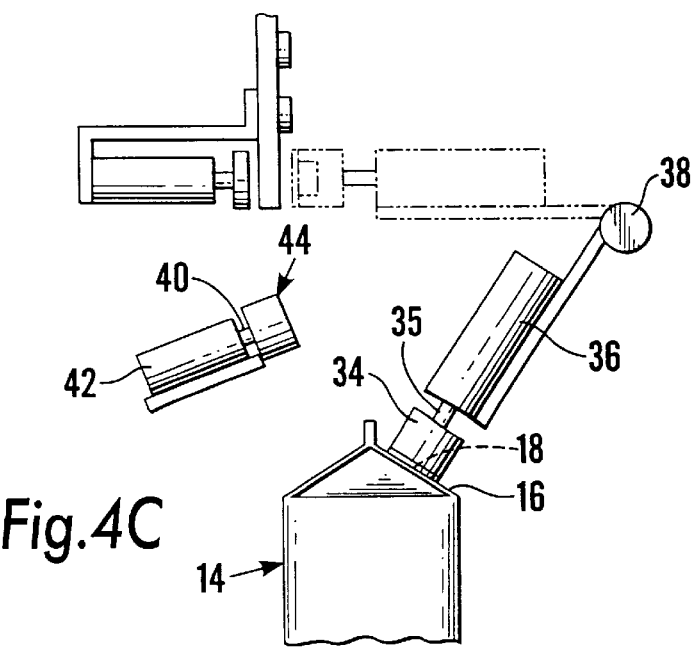
FIG. 4C is a side view of the fitment-loading apparatus and the fitment-heating apparatus and of a fitment-placing apparatus operating at the fitment-heating and-placing station.
Figure 7:
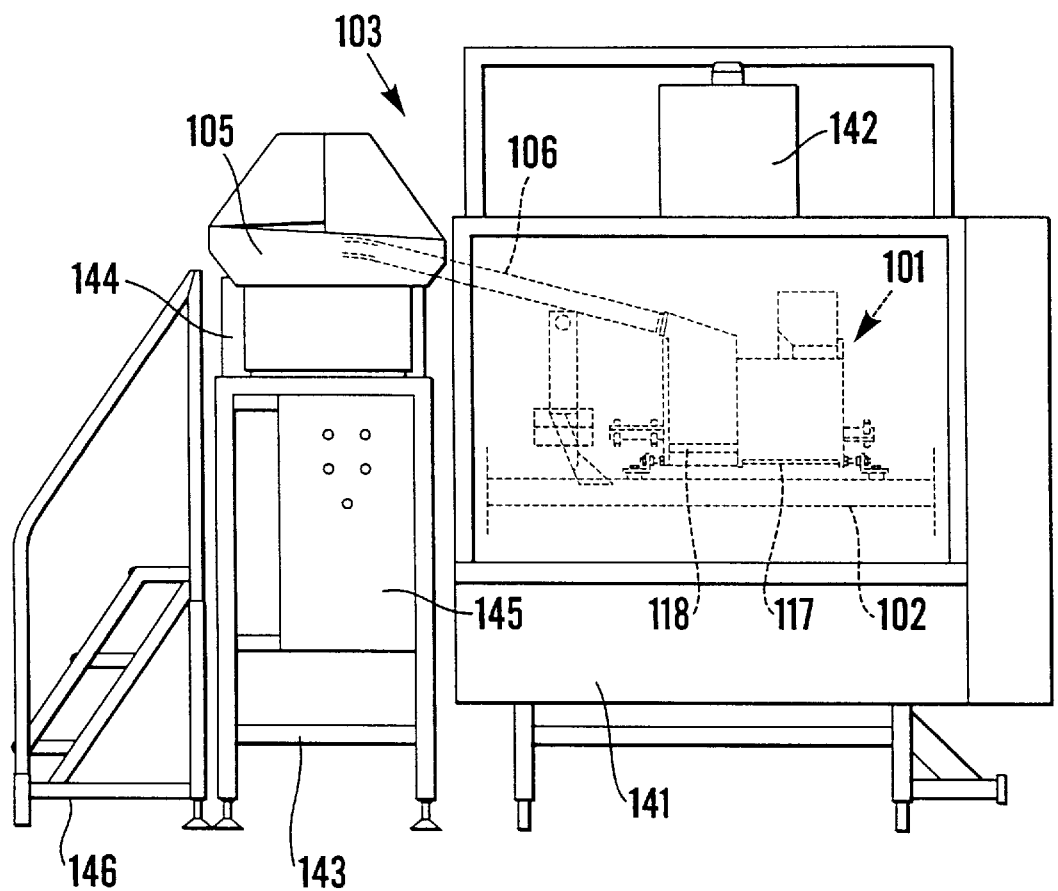
FIG. 7 is a diagrammatic side view of apparatus including a fitment-attaching machine constituting another embodiment of the invention.
Figure 8:
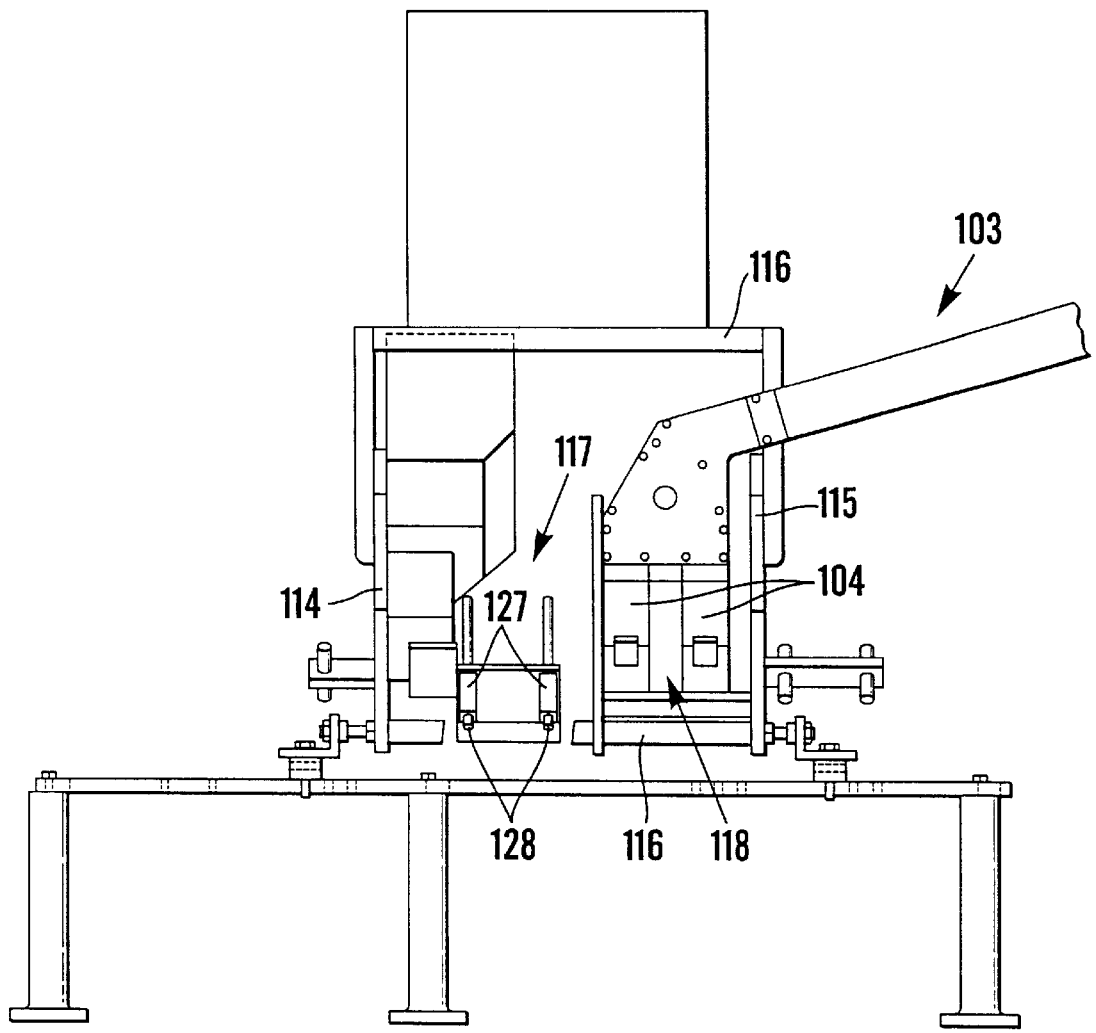
FIG. 8 is a diagrammatic, opposite side view of that other embodiment
Figure 9:
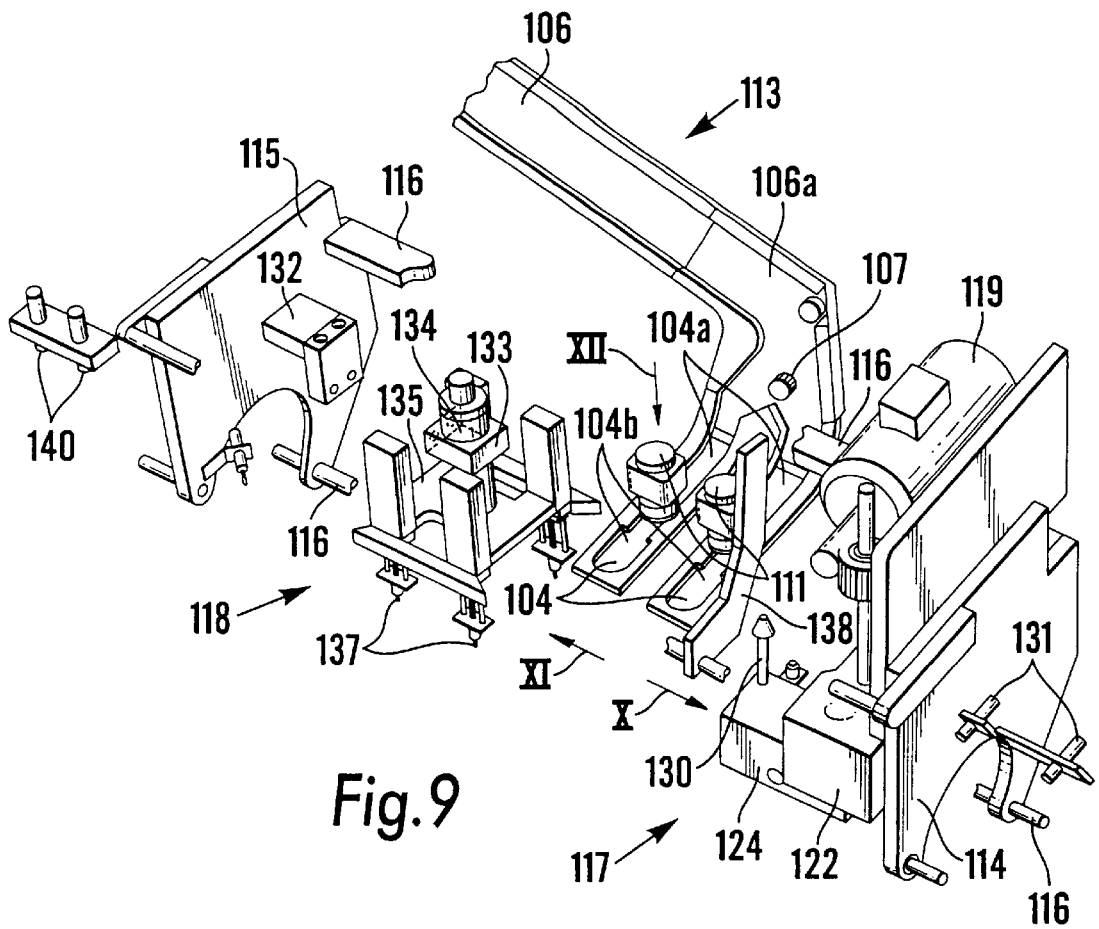
FIG. 9 is a diagrammatic, exploded, perspective view from above of that other embodiment.
Figure 12:
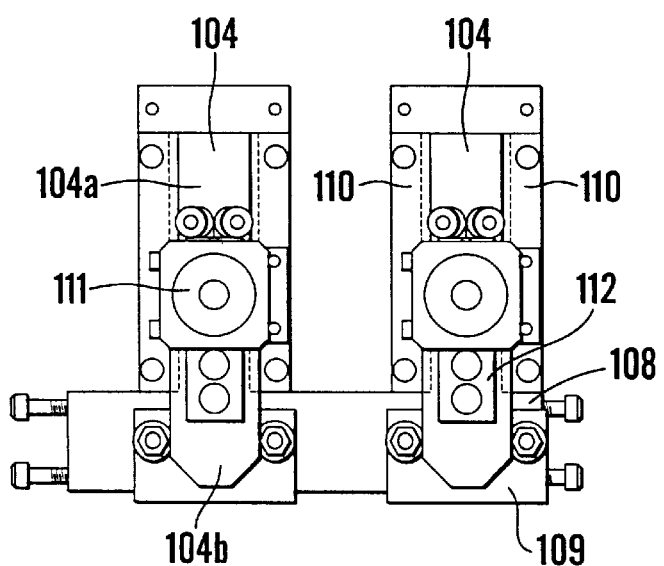
FIG. 12 is a view taken in the direction of the arrow XII in FIG. 9.
Figure 10:
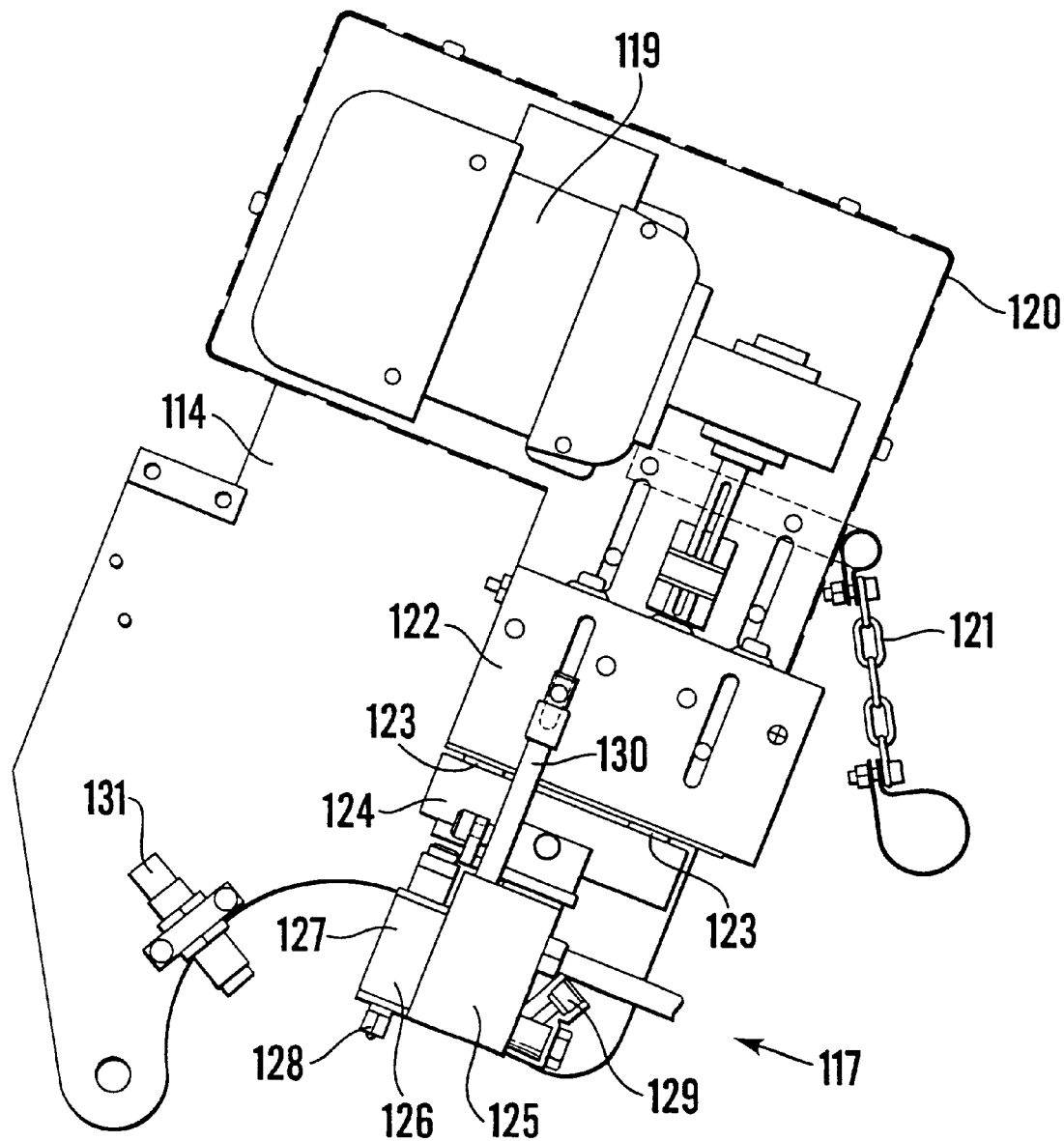
FIG. 10 is an elevation taken in the direction of the arrow X in FIG. 9.
Figure 11:
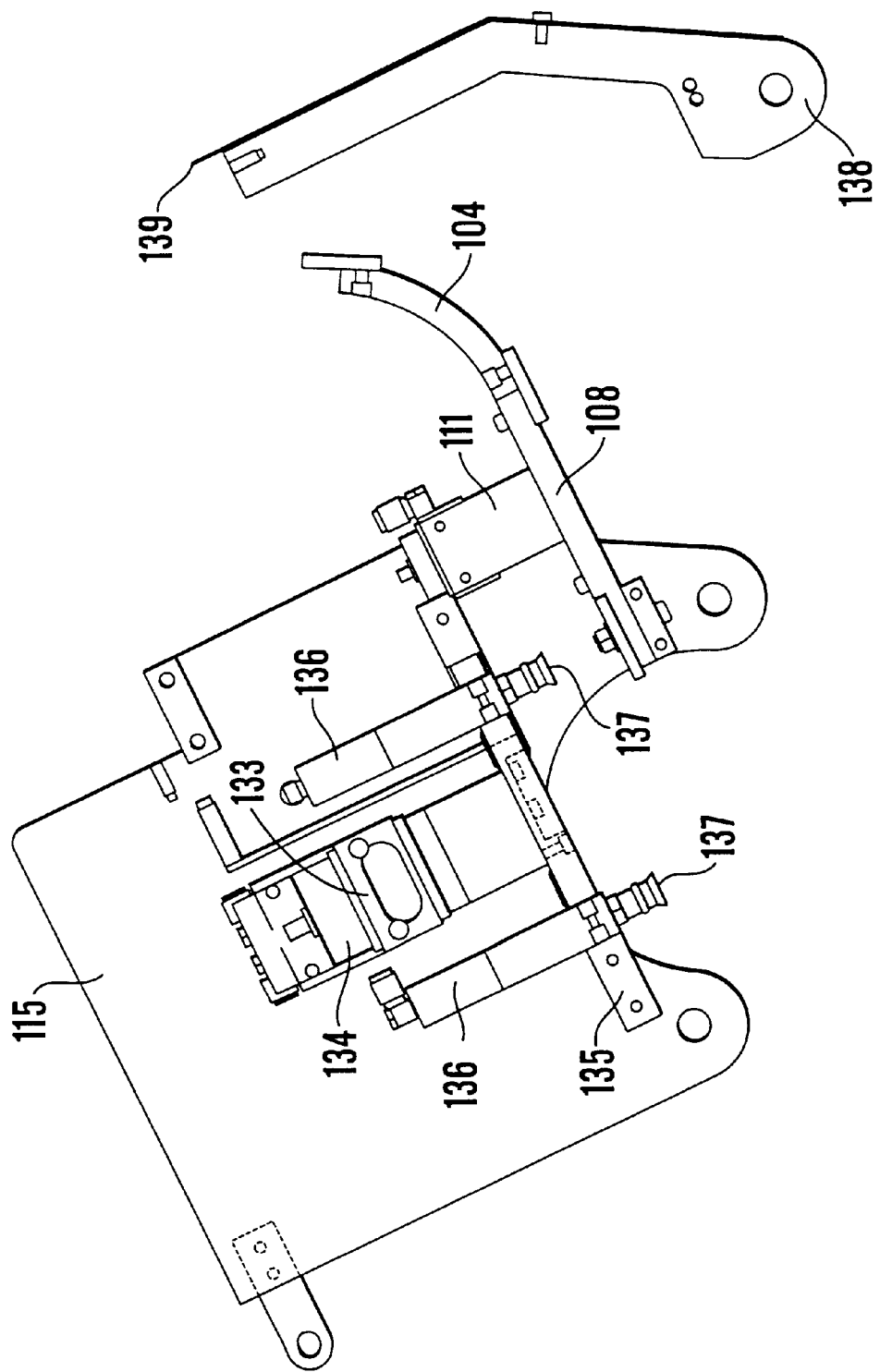
FIG. 11 is an elevation taken in the direction of the arrow XI in FIG. 9.

FIG. 2 represents the seven stations I through VII, through which the carton 14 is indexed within the machine 10, namely, station I for entry of the filled and sealed carton (FIG. 1, conveyor 12 entering machine 10);

II for heating a selected panel of the carton (FIG. 3A);

III for loading and heating a pour spout fitment 20 and placing the same on the heated selected panel (FIGS. 4A, 4B and 4C);

IV for pressing and cooling the fitment (FIG. 5);

V for a second pressing and cooling of the fitment (FIG. 5);

VI for inspecting; and

VII for exiting the package from the machine 10.

Any one of various known retaining and conveying techniques is employed to assure that the containers 14 to have fitments 20 attached thereto are carried in a spaced relationship on the existing conveyor 12 (which permits the containers 14 to vary their spatial relationships) through the stations I–VII of the machine 10. These techniques include, for example, form-fitting timing screws, represented as 11, shuttle and clamp systems with forward and reverse motions, and so-called "walking paddle" systems with forward and reverse air cylinder provisions. If containers 14 to be advanced by the conveyor 12 are not to have fitments applied thereto, then the machine 10 and its timing screws 11 can be simply removed from the conveyor 12.

Alternatively, the conveyor 12 can itself take the form of a conveyor which prevents the containers 14 from moving relative to it along or across it, for example it could be a pocketed chain conveyor.

FIG. 3 illustrates the carton 14 having an upper panel 16 with a weakened line 18 formed therein; and a high density polyethylene coated, or other plastic pour spout fitment 20 having a body 22, a cap 23, and an external mounting flange 24. The weakened line 18 may be a circular score line or partial depth cut line. In some applications it may be an opening.

FIG. 3A illustrates a round heated tool 25 having an annular shape for surrounding the loop-form weakened line 18 in the panel 16. The tool 25 is adapted to be extended by an air cylinder 25a to abut against and heat an annular surface portion around the weakened line 18 to a predetermined temperature, and then retracted therefrom. The predetermined temperature is below the melting point of the thermoplastic coating of the carton.

As shown in FIG. 4A, station III includes a track 26 with pour spout fitments 20 stacked and slidable downwardly therein, abutting flange against flange. The fitments 20 are oriented and supplied to the track 26 by a well-known vibratory parts feeder, represented at 28 in FIG. 1, mounted on top of the machine 10. At the bottom of the track 26, an abutment 29 on the distal end of a piston 30 of a fixed first cylinder 32 serves to push the end fitment laterally into an opening 33 formed in a receiver 34 on a piston 35 of a second cylinder 36. The cylinder 36 is secured at the rear end thereof to a is horizontal pivot 38. Upon receiving the fitment 20, the second cylinder 36 is pivoted a predetermined number of degrees downwardly (counterclockwise) to a selected position, such as shown in FIG. 4B, to become axially aligned with a fixed third cylinder 42. In this position, a piston 40 of the fixed third cylinder 42, having a hot annular tool 44 on the end thereof, is extended so as to cause the hot tool 44 to engage the face 46 of the flange 24 of the fitment 20, to thereby heat the flange to a predetermined temperature. Such predetermined temperature is below the melting point of the plastic mounting flange 24.

Upon retraction of the hot annular tool 44, as shown in FIG. 4C, the second cylinder 36 is next pivoted further in a downwardly counterclockwise direction about the pivot 38 to a position in alignment with the weakened line 18 of the panel 16. The piston 35 of the second cylinder 36, and its fitment-laden receiver 34, are extended to place the flange 24 of the fitment 20 onto the panel 16 around the weakened line 18.

As shown in FIG. 4D, the annular tool 44 may consist of a round block 46 having a round recess 48, comparable to the inside diameter of the flange 24, formed in one end face 50 thereof. A connector hole 52 is formed in the center of the other face 54, a deeper hole 56 is formed in the face 54 off-set from the hole 52, suitable for the insertion therein of a heat source (not shown) and a still deeper hole 58 is also off-set from the hole 52, suitable for the insertion therein of a temperature-detecting probe (not shown). The hole 58 may extend to a point close to the face 50, off-set from the periphery of the recess 48.

The end face 50 is machined flat and, preferably, includes a coating of suitable non-stick coating material for engaging the flange 24. The tool 25 of FIG. 3A may be formed so as to be similar to the tool 44 of FIG. 4D for engaging and heating the panel 16 around the weakened line 18.

Upon retraction of the piston 35, the cylinder 36 is pivoted in a clockwise direction to its initial position shown in FIG. 4A, and the conveyor 12 indexes to station IV (FIG. 2), where a suitable cup-shaped and cooled anvil, represented at 60 (FIG. 5), and mounted on a piston 62, is pressed by an air cylinder 64 against the exposed surface 66 of the flange 24 to bond the flange to the panel 16. At station V, pressing by an additional cooled anvil 60 and air cylinder 64 assembly is administered to enhance the bonding action.

After inspection by any convenient means, such as a photoeye arrangement (not shown), at station VI, the packages consisting of the filled and sealed cartons 14 and their bonded fitments 20 are exited from the machine 10, to be carried by the conveyor 12 to a shipping point (not shown).

FIG. 6 represents a double indexing arrangement wherein each two adjacent cartons 14 are processed concurrently by dual equipment in the manner described above. The vibratory parts feeder 28 is adaptable to feeding oriented fitments to dual tracks 26.

It should be noted that the thermal energy required to be supplied to the flange 24 by the hot annular tool 44 depends upon various parameters, such as:

a. the melting point of the material of the flange surface 46, b. the storage temperature of the fitments 20, c. the ambient temperature within the machine, d. the humidity, and e. the melting point of the thermoplastic coating of the carton.

Referring to FIGS. 7 to 12, the apparatus comprises a fitment-attaching machine 101 mounted over a conveyor 102 carrying the formed, filled and sealed thermoplastic-coated cartons (not shown). The conveyor 102 may be an existing conveyor of a forming, filling, and sealing machine or may be another, existing conveyor constituting a linear extension of the existing conveyor of that machine. Whatever the case, the path of the cartons from before the top-sealing station (not shown) of the form, fill and seal machine to after the machine 101 does not turn back upon itself. The conveyor 102 is a double, endless-chain conveyor, the two chains of which define therebetween pockets which closely receive the filled and top-sealed cartons 14. These pockets sufficiently closely receive the cartons 14 that the cartons are firmly held therein and can thus accurately receive the flanges 24 of the fitments 20. The apparatus comprises a double indexing arrangement wherein each two adjacent cartons are processed concurrently by dual equipment. A vibratory fitments feeder 103 feeds fitments in an oriented condition to dual tracks 104.

The feeder 103 comprises a reservoir bowl 105 connected by a single track 106 to the dual tracks 104, there being an oscillatorily rotated toothed wheel 107 at the branching from the track 106 to the tracks 104 to discourage jamming of the fitments 20 at the branching location. The edge walls of the track 106 and of earlier sections 104a of the tracks 104 have overhangs to provide undercuttings to receive and guide the flanges 24 of the fitments 20, whilst later sections 104b of the tracks 104 have side walls without such overhangs so that the fitments 20 can be readily picked therefrom. In particular, each track 104 includes a channel 108 with a terminating wall 109 across a lower end thereof. Each channel 108 has a pair of overhanging strips 110 attached to the upper edges of the respective side walls thereof. Partway along each section 104a is an escapement device 111 including a shutter 112 and whereby the fitments in the section 104a are fed one-by-one to the section 104b. The tracks 104, the escapement devices 111 and the outlet end zone 106a of the track 106 are part of a fitment-attaching device 113 having respective opposite end walls 114 and 115 arranged one after the other along the path of advance of the cartons in the conveyor 102. The end walls 114 and 115 are interconnected by members 116 extending parallelly to that path of advance. Between the two plates 114 and 115 there are only two stations and these are double stations, namely an adhesive application station 117 and a fitment pick-and-place station 118. Mounted on the plate 114 is an electric motor 119 having a removable safety guard 120 anchored via a chain 121. The output from the motor 119 is taken to a single-to-dual drive, gear transmission 122, the dual outputs from which are two synchronous parallel movements in side-by-side circles performed by two eccentric output pins 123. A support link 124 is mounted on the pins 123 and thus performs a motion parallel to itself. Fixed to the link 124 is a mounting 125 for a pair of adhesive guns 126 consisting of respective dosing devices 127 and respective nozzles 128 which deliver respective dosed jets of adhesive. The dosing devices 127 are operated pneumatically through a compressed air inlet 129 connected to a compressed air line (not shown), and are supplied with adhesive through respective inlet pipes 130 connected to respective adhesive supply lines (also not shown). Fixed to respective opposite sides of the end plate 114 are photoelectric detectors 131 which disable the two stations 117 and 118 when a carton is not approaching the station 117. Fixed to the plate 115 is a bracket 132 to which is fixed a table 133 through which is mounted a drive device 134 which serves to index a pick-and-place supporting plate 135 rotatingly through 180°. Mounted in the plate 135 in a rectangular array are four pneumatic piston-and-cylinder devices 136 which reciprocate respective suction nozzles 137 perpendicularly to the plate 135. Provided between the stations 117 and 118 is an outrigger bracket 138 carrying a guard sheet 139. Beyond the end wall 115 is fixed a pair of photoelectric detectors 140 which stops cartons from approaching the station 117 in the event that a pre-selected number of cartons leaving the station 118 are without fitments 20 thereon. The machine 101 and the conveyor 102 are mounted in a housing 141 upon which is carried a cabinet 142 containing controls for the pneumatically operated items of the apparatus. Adjacent the housing 141 stands a platform assembly 143 which carries the bowl 105, an adhesive hot melt unit 144 and a cabinet 145 for electrical controls of the main electrically operated items of the apparatus. Shown adjacent the platform assembly 143 are access steps 146.

In operation of the apparatus described with reference to FIGS. 7 to 12, filled and top-sealed cartons 14 arrive in pairs at the station 117, where, with the cartons stationary, jets of hot melt adhesive are dosed from the nozzles 128 onto the respective roof panels 16 of the cartons 14 of the pair, to form circular beads of hot melt adhesive concentric with and just to the outside of the circular loops of weakness 18, the nozzles 128 each performing more than one revolution, in order to apply the hot melt adhesive relatively evenly and to provide a relatively deep bead of adhesive in order to obtain a strong attachment of the fitment to the carton, particularly by thus ensuring that the adhesive retains its tackiness long enough to ensure that the thermoplastics of both the fitment and the carton fuse well to the adhesive. The pair of cartons carrying the circular beads are indexed to the station 118, where the two nozzles 137 further from the tracks 104 firmly apply respective pour spout fitments 20 carried thereby to the respective beads of hot melt adhesive, the respective flanges 24 being applied coaxially to the circular beads, while the two suction nozzles 137 nearer the tracks 104 are applied to two pour spout fitments in the respective track sections 104*b*. Then suction is released from the pair of nozzles 137 further from the tracks 104, but applied to the pair of nozzles 137 nearer the tracks 104 and the pneumatic devices 136 are operated to retract all four nozzles 137 upwardly, so that the nearer pair of nozzles 127 picks the next two pour spout fitments 20 from the sections 104*b*. When the nozzles 137 are fully retracted, the device 134 turns the plate 135 through 180°, to await the arrival of the next pair of cartons from the station 117. Meanwhile, the pair of cartons to which the pour spout fitments have been applied is indexed out of the station 118, and the escapement devices 111 supply the next two pour spout fitments 20 to the sections 104*b*.

Figure 13:
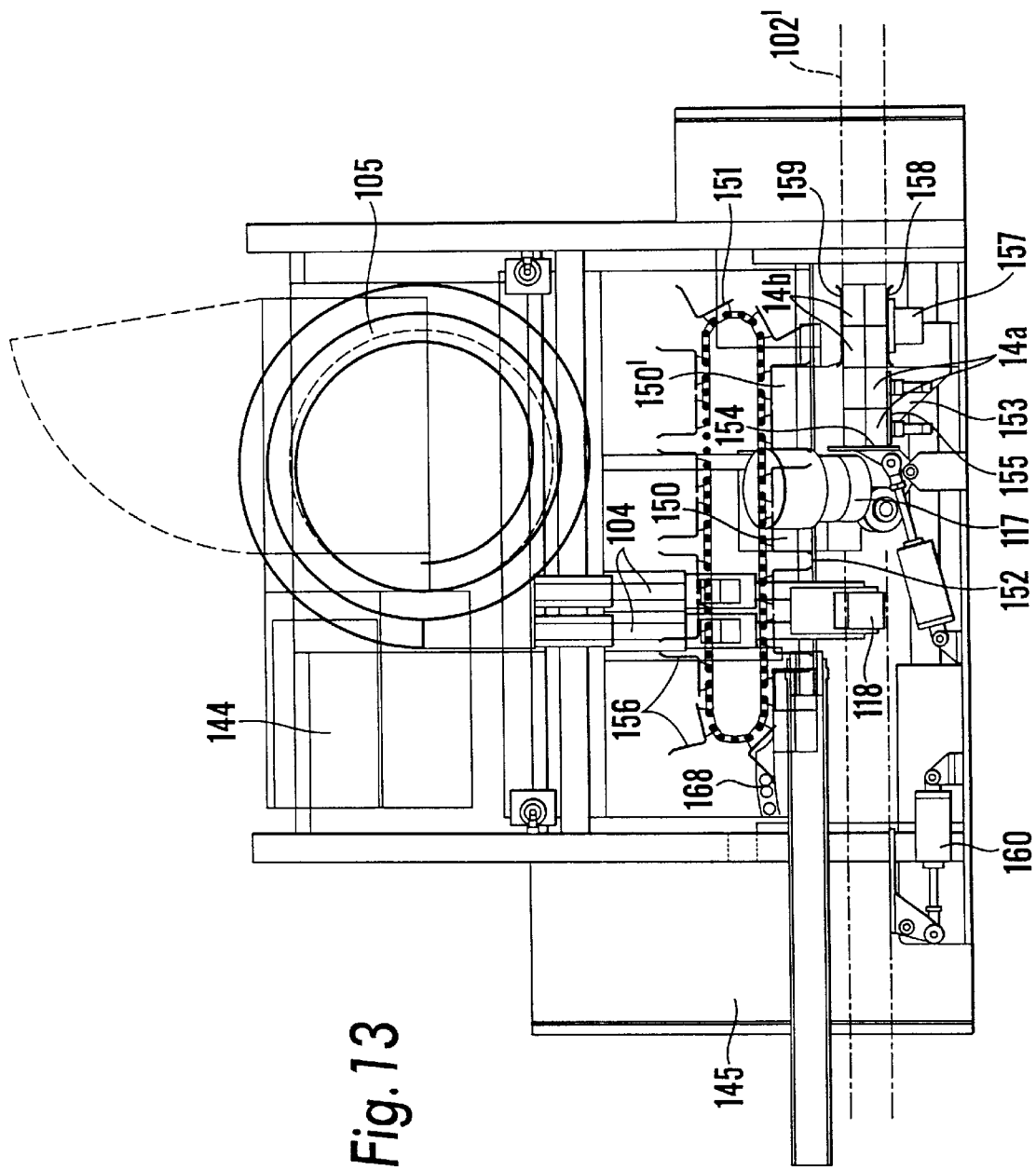
FIG. 13 is a diagrammatic top plan view of a modified apparatus constituting a third embodiment of the invention.
Figure 14:
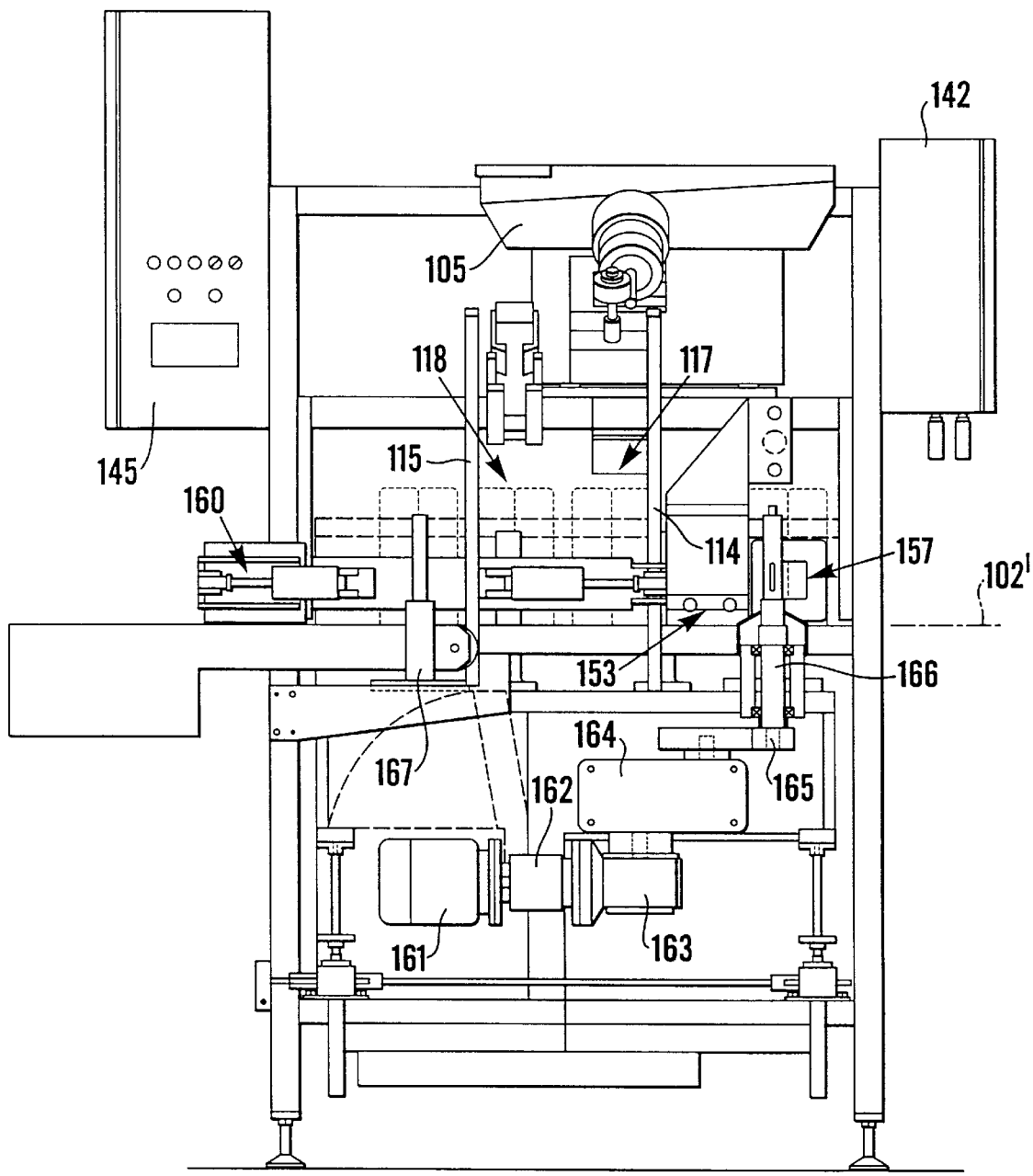
FIG. 14 is a diagrammatic side elevation of that modified apparatus.

The embodiment shown in FIGS. 13 and 14 differs from that of FIGS. 7 to 12 chiefly in that the apparatus may receive an existing conveyor 102' of a non-pocketed form, for example a slat conveyor extending from a carton form, fill and seal machine and, when the cartons 14 are to receive pour spout fitments 20, they are shifted horizontally laterally in pairs into pockets 150 provided between an indexing endless-chain conveyor 151 and a fixed vertical plate 152 extending parallelly to the runs of the endless chain conveyor 151 and to the conveyor 102'. Immediately upstream of the adhesive application station 117 is a carton loading station 153 at which a carton end stop plate 154 stops the leading pair 14*a* of cartons 14 on the conveyor 102' and at which a pusher plate 155 pushes the carton pair 14*a* into a recess 150' provided by one of a series of pairs of right-angle bracket plates 156 of the indexing conveyor 151. Before the plate 155 pushes the carton pair 14*a* laterally, a carton-retaining device 157 immediately upstream of the station 153 and consisting of a movable vertical plate 158 and a fixed vertical plate 159 clamps the immediately following carton pair 14*b* until the plate 155 has completely retracted from advancing the carton pair 14*a* into the recess 150'. The recess 150' advances parallelly to, and in the same direction as, the advance of the cartons 14 along the conveyor 102' and carries the carton pair 14*a* firstly to the station 117 where, with the fixed plate 152, it forms the pocket 150 and the circular beads of adhesive are applied to the respective cartons by the nozzles 128 (not seen in FIGS. 13 and 14). Then the same recess 150' advances the carton pair 14*a* to the next station, which is the fitment pick-and-place station 118 to which the fitments 20 are fed two-at-a-time by the tracks 104 supplied from the bowl 105. Each carton pair leaving the station 118 is returned to the conveyor 102' by co-operation between a guide 168 and a pair of conveyor chains (not seen) which advance the carton pair onto the conveyor 102'. Each carton pair may be unloaded from that conveyor by a carton unloading device 160. The indexing chain conveyor 151 is driven by an electric motor 161 through a brake/clutch combination 162, a gear box 163, an indexer 164, a gear train 165, and a drive shaft 166. At its other end, the chain passes around an idler shaft 167.

All of the three embodiments described with reference to the drawings have the advantage that the path of the filled and top-sealed cartons leaving the form, fill and seal machine need not be interrupted nor turn back upon itself, whereby it is possible to minimise the space requirement for that path and also to maintain a higher average speed of the cartons along the path. Another advantage of all three embodiments is that they can be installed immediately adjacent to an existing conveyor downstream of the form, fill and seal machine or, even, in the case of the embodiment of FIGS. 7 to 12, the fitment-attaching machine can be installed immediately above an existing, pocketed conveyor, so as to apply adhesive and then fitments to the cartons while they are in the pockets of that existing conveyor; in this respect, such existing conveyor may be the exit end zone of the conveyor of the form, fill and seal machine itself.

It should be apparent that preferred embodiments of the invention provide a novel method of applying an article, such as a pour spout fitment, to an erected thermoplastic-coated container in a machine mounted over a conveyor downstream of a sealing station of a forming, filling and sealing machine, thus saving valuable floor space in production areas.

It should also be apparent that, by heating to a predetermined temperature a surface of a fitment, such as a pour spout fitment, remotely from a thermoplastic-coated container, there is no need for employing the heretofore well known methods of (1) a container surface being backed up by a support mechanism, such as a mandrel or an anvil; or (2) applying ultrasonic vibration and pressure to a fitment surface and container panel combination.

It should be further apparent that the filled and sealed container provides a box-type support, capable of being subjected to the application pressure involved, without the need for a mandrel or anvil back-up, as heretofore used.

It should be still further apparent that the carton top closure could be any of a gable top, slant top, or flat top configuration, with the various heating, placing, and cooling apparati directed accordingly.

What is claimed is:

1. A method comprising manufacturing a first package by forming a first container, filling the container with contents, sealing the filled container and then advancing the first container by first conveying means, characterized by subsequently installing attaching means over said first conveying means without altering said first conveying means and manufacturing a second package by forming a second container, filling the second container with contents, sealing the filled second container, advancing the second container by said first conveying means, and operating said attaching means to attach an article to an external surface of the filled and sealed second container.

2. A method according to claim 1, wherein said conveying means prevents each container from moving relative to and along or across said conveying means while the container is advanced thereby.

3. A method according to claim 1, wherein said attaching comprises applying adhesive to said external surface of the filled and sealed second container to provide a bead in the form of a closed loop of adhesive, and applying to said bead an annular portion of said article, which annular portion is of a form corresponding to that of said bead, whereby said adhesive attaches said article to said second container.

4. A method according to claim 3, wherein said bead extends around one of an opening and a loop of weakness in said external surface.

5. A method according to claim 4, wherein said attaching comprises the steps of:

a. heating a portion of said external surface of the filled and sealed container to a predetermined temperature;

b. receiving said article from a supply source by a receiver;

c. displacing said receiver so as to expose a selected surface portion of said article to a heat source to heat said selected surface portion to a predetermined temperature;

d. displacing said receiver further so as to place the heated surface portion of said article onto the heated surface portion of said container; and e. pressing a cooled anvil against a selected surface of said article to bond the heated surface portion of said article to said heated surface portion of said container.

6. A method according to claim 5, wherein said displacing of the step c and said displacing of the step d each comprise pivoting of said receiver.

7. A method according to claim 5 or 6, wherein said displacing of the step d includes extension of a piston of a pivotally mounted fluidic piston-and-cylinder device carrying said receiver.

8. Apparatus for manufacturing a package, comprising forming means for forming a container, filling means after said forming means for filling said container with contents, sealing means after said filling means for sealing the filled container, article attaching means after said sealing means for attaching said article to an external surface of the filled and sealed container, and conveying means extending past, in turn, said forming means, said filling means, said sealing means and said attaching means, wherein said attaching means was installed at said conveying means without said conveying means having been altered and wherein said displacing means comprises pivoting means for turning said receiver about an axis of pivoting.

9. Apparatus according to claim 8, wherein said receiver is mounted on a reciprocatory piston of a pivotally mounted, fluidic, piston-and-cylinder device, and an abutment on the end of a reciprocatory piston of a stationarily mounted, fluidic, piston-and-cylinder device serves to push the article from said supply source to the receiver.

10. Apparatus according to claim 8, wherein said conveying means prevents said container from moving relative to and along or across said conveying mere while the container is advanced thereby.

11. Apparatus according to claim 8 or 10, wherein said conveying means permits said container to move along and relative to said conveying means while said container is advanced thereby, and further comprising second conveying means arranged in parallel with the first-mentioned conveying means and extending past said attaching means and preventing said container from moving relative to and along or across said second conveying means while said container is advanced thereby.

12. Apparatus according to any one of claims 8, 10 or 11, wherein said attaching means comprises adhesive-applying means including a nozzle for jetting adhesive onto said external surface, and nozzle-moving means arranged to move said nozzle over a path in the form of a closed loop, thereby to provide on said external surface a bead in the form of a closed loop of adhesive, and wherein said attaching means further comprises article-applying means for applying an annular portion of said article to said bead.

13. Apparatus according to any one of claims 8, 10 or 11, wherein said attaching means comprises heating means for heating to a predetermined temperature a portion of said external surface, a receiver for receiving said article from a supply source, a heat source for heating a surface portion of said article to a predetermined temperature, displacing means for displacing said receiver so as to expose said article therein to said heat source and for displacing said receiver further so as to place the heated surface portion of said article onto the heated surface portion of said container, a cooled anvil, and pressing means for pressing said cooled anvil against a selected surface of said article to bond said heated surface portion of said article to said heated surface portion of said container.

14. A method for securing articles to container panels, said method comprising the steps of:

a. heating to a predetermined temperature a surface of a selected panel of an erected container;

b. receiving an article from a supply source by a receiver;

c. displacing said receiver so as to expose a selected surface of said article to a heat source to heat said surface to a predetermined temperature;

d. displacing said receive further so as to place the heated surface of said article onto said surface of said erected container; and e. pressing a cooled anvil against another selected surface of said article to bond said heated surface thereof to said heated surface of said erected container;

wherein said displacing of the step c and said displacing of the step d comprise progressive pivoting.

15. Apparatus for receiving an article and placing said article on a selected panel of an erected container, said apparatus comprising a pivotally mounted, fluidic, piston-and-cylinder device having a reciprocable receiver provided thereon, a first stationarily mounted, fluidic, piston-and-cylinder device having a reciprocable abutment provided thereon for pushing said article from a track into said receiver, a second stationarily mounted, fluidic, piston-and-cylinder device having a reciprocable heated tool provided thereon for heating a surface of said article upon the pivoting of said article into alignment therewith by the pivotally mounted piston-and-cylinder device, the pivotally mounted piston-and-cylinder, after further pivoting thereof, serving to place said heated surface of said article on said selected panel.

16. A method comprising manufacturing a package by forming a container, filling the container with contents, sealing the filled container and then advancing the container by first conveying means, characterized by installing attaching means over said first conveying means without altering said first conveying means, and operating said attaching means to attach an article to an external surface of the filled and sealed container, wherein said first conveying means permits each container to move along and relative to said first conveying means while the container is advanced thereby, the installing of said attaching means is accompanied by the installing, at and in parallel with, said first conveying means and without altering said first conveying means, of second conveying means which prevents said container from moving relative to and along or across said second conveying means while the container is advanced thereby, and said advancing of said container past said attaching means is performed by said second conveying means.

17. A method comprising manufacturing a pair of packages by forming a pair of aligned containers, filling the containers with contents, sealing the filled containers and then advancing the containers by first conveying means, characterized by installing dual attaching means over said first conveying means without altering said first conveying means, and operating said dual attaching means to attach an article to an external surface of each filled and sealed container, wherein said first conveying means permits each container to move along and relative to said first conveying means while the container is advanced thereby, the installing of said attaching means is accompanied by the installing, at and in parallel with, said first conveying means and without altering said first conveying means, of second conveying means which prevents said container from moving relative to and along or across said second conveying means while the containers are advanced thereby, and said advancing of said containers past said dual attaching means is performed by said second conveying means.

\* \* \* \* \*